(No Model.) 2 Sheets—Sheet 1.
W. H. STEVENS.
ATTACHMENT FOR CORN PLANTERS.
No. 381,036. Patented Apr. 10, 1888.
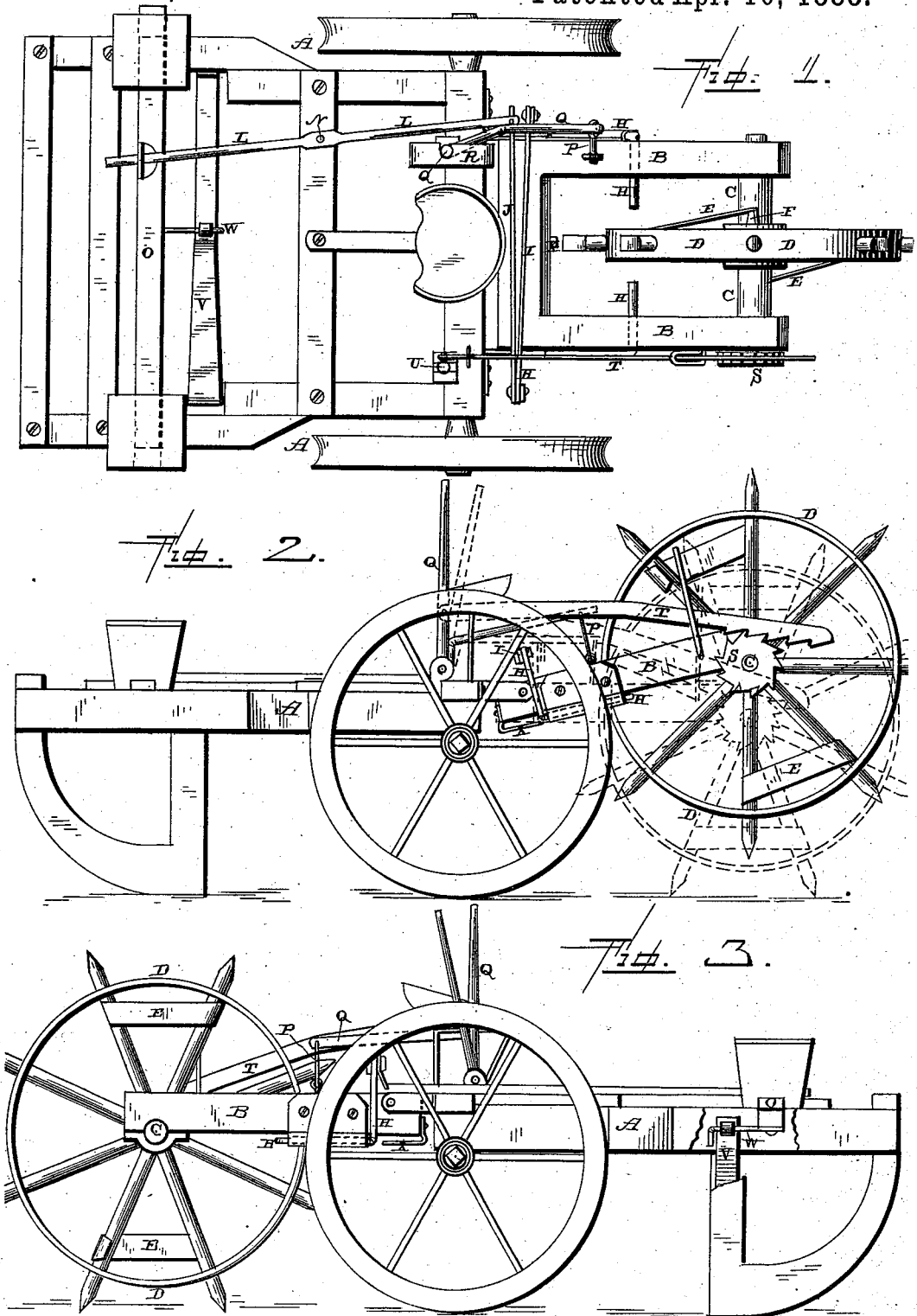

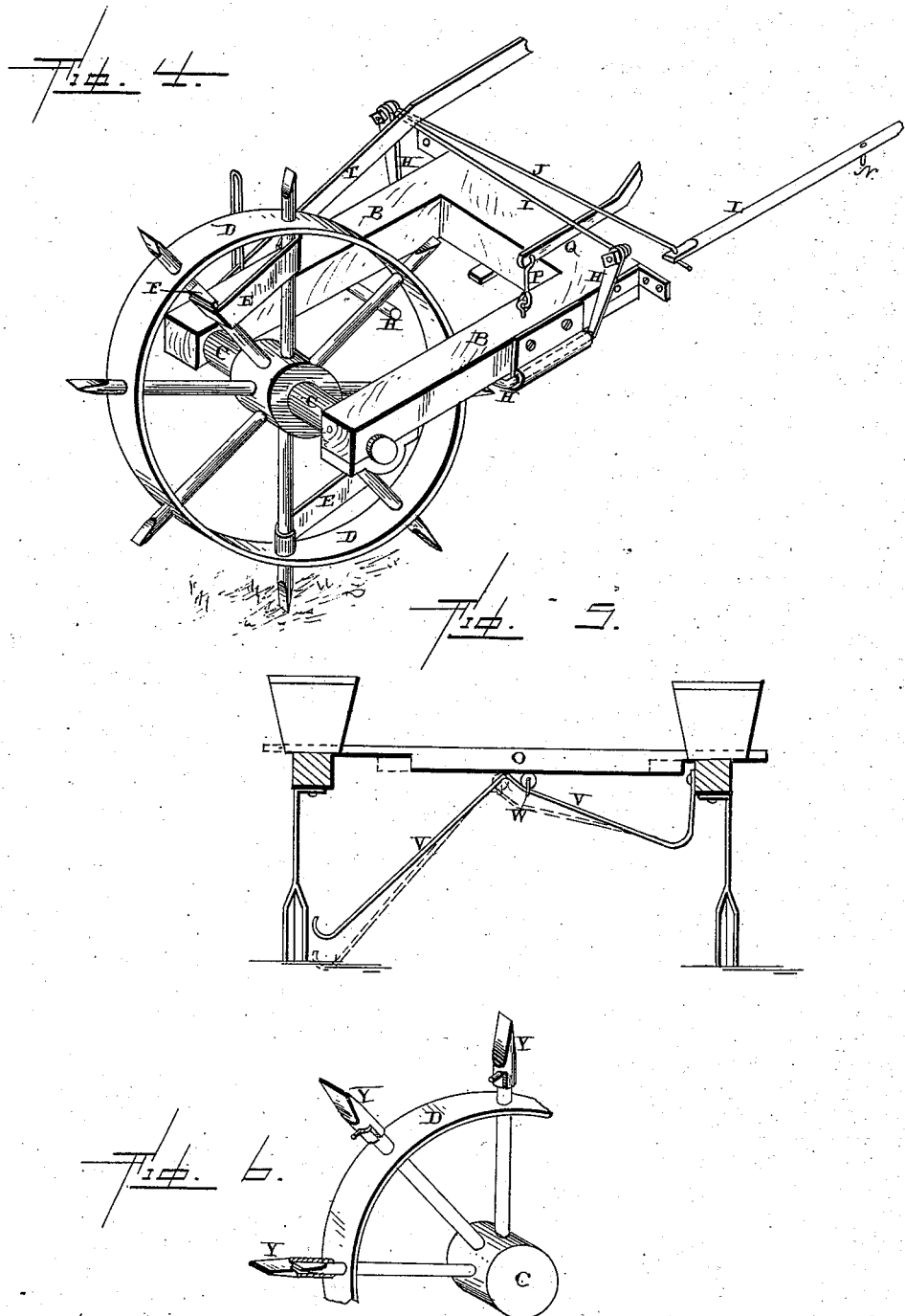

UNITED STATES PATENT OFFICE.

WILLIAM H. STEVENS, OF ABBOTT, MISSISSIPPI.

ATTACHMENT FOR CORN-PLANTERS.

SPECIFICATION forming part of Letters Patent No. 381,036, dated April 10, 1888.

Application filed January 16, 1888. Serial No. 260,919. (No model.)

*To all whom it may concern:*

Be it known that I, WILLIAM H. STEVENS, of Abbott, in the county of Clay and State of Mississippi, have invented certain new and useful Improvements in Attachments for Corn-Planters; and I do hereby declare the following to be a full, clear, and exact description of the invention, such as will enable others skilled in the art to which it pertains to make and use it, reference being had to the accompanying drawings, which form part of this specification.

My invention relates to an improvement in attachments for corn-planters; and it consists in, first, an attachment for a corn-planter, consisting of a frame which is loosely pivoted at its front end to the rear of the corn-planter, and which has pivoted in its rear end a wheel which engages positively with the ground, and which has a ratchet-wheel rigidly secured to the end of its shaft, in connection with a lever and ratchet-rod, by means of which the actuating-wheel can be operated by the driver while the planter is standing still; second, the arrangement and combination of parts, which will be more fully described and shown hereinafter, and pointed out in the claims.

The object of my invention is to provide an attachment for any of the ordinary forms of corn-planters now in use, and by means of which the corn can be planted at regular distances apart and always in line, to operate all the operating parts of the planter by means of a wheel which engages positively with the ground and never becomes clogged, and hence causes the corn to be dropped at regular intervals apart, and to do away with operating the seed-slide from the driving-wheels, which become clogged with dirt, and hence operate the slide so irregularly as to have the hills out of check with each other.

Figure 1 is a plan view of my invention complete, shown in connection with an ordinary form of corn-planter. Fig. 2 is a side elevation of the same, the attachment being shown in one position in solid lines and in another position in dotted lines. Fig. 3 is also a side elevation taken from the opposite side of the planter. Fig. 4 is a perspective of the attachment taken by itself. Fig. 5 is a side elevation of the marker. Fig. 6 is a detail view of the extensions.

A represents a corn-planter, such as is in general use; but I do not limit myself to the construction here shown, for my invention may be applied to any of the ordinary forms of corn-planters now in general use. Hinged loosely, pivoted, or connected to the rear end of the planter in any suitable manner is the frame B, of any suitable construction, and which has the shaft C journaled in its rear end. Secured rigidly to this shaft C is the operating-wheel D, which has the outer ends of its spokes to project beyond the rim a suitable distance, and the outer ends of these spokes are flattened, so as to engage positively with the ground, and thus prevent the wheel from slipping as the planter is drawn along. These sharpened ends of the spokes project a suitable distance beyond the rim, so as to prevent the wheel from becoming clogged with dirt, and thus cause it to operate the seeding mechanism regularly. Secured to opposite sides of this wheel D are the cams E, of which there may be any desired number, according to the distance apart it is desired to drop the corn. As here shown, there is one upon each of the sides of the wheel; but there may be any desired number of them, according as it is desired to drill the corn or plant it in hills. These cams consist of blocks F, which are rigidly clamped to one of the spokes of the wheel inside of the rim, and the plates, which are fastened at one end to the block and at the other end to another spoke. The spokes cause one end of the plate to set out far enough from the side of the wheel to operate the corn-dropping mechanism without any shocks or jars, as is the case where simply blocks alone are used for this purpose. As the planter is drawn along, the ends of the spokes engage positively with the earth and cause the wheel D to revolve.

Journaled upon opposite sides of the frame B, near its front end, are two rock-shafts, H, which, as the wheel D revolves, alternately engage with the cams E, and thus cause the upper ends of the rock-shafts, which are connected together by the rod I, which extends across the top of the frame B, to move in the same direction. Connected to the upper end of one of these rock-shafts, by the rod J, is the lever L, which is pivoted at the point N upon the frame, and which has its front end connected in any suitable manner to the dropping-bar O, by which the slides in the seed-boxes are operated. Each time that one of the cams E operates one of the rock-shafts this lever L is moved, so as to operate the bar O.

Connected to the top of the frame B is a short connecting-rod, P, to which each end of the lever Q is connected. The front end of the lever Q projects up alongside of the catch R and the driver's seat, and by means of which lever the driver can raise the frame B, so as to throw the entire seeding mechanism out of gear. When the frame B is raised, as shown in dotted lines, the lever Q is held in position by the catch R, and then the points of the spokes no longer engage with the ground, and the wheel D remains at rest while the planter is drawn along.

Secured rigidly to one end of the shaft C is a ratchet-wheel, S, with which the ratchet-rod T, pivoted at its front end to the lever U, engages. When the driver wishes to drop the seed at any particular point, as when starting at the end of a row, he has but to move the front of the planter into the desired position, and then by operating the lever U and ratchet T cause the wheel D to turn until one of the cams E has operated the lever L and dropped the seed, and then the driver moves forward with the machine and the seed is dropped regularly all along the row. The driver operates the wheel D while the frame B is raised above the ground and the wheel is out of operation. By means of the lever U and rod T he can adjust the seeding mechanism so as to drop at any desired point, and thus always bring the hills in check with each other. Where there is no arrangement of this kind, if the seed is to be dropped in line, the driver must dismount and adjust the wheel by hand. As the parts are here constructed, the driver never leaves his seat and loses no unnecessary time.

In order to mark the places where the corn is dropped along one row, there is secured to the front of the corn-planter the bent spring V, which is secured at one end, extends across the frame, and has its opposite end loose. This free end is turned upward, and each time that the end is depressed it leaves a concaved depression in the ground, so as to indicate just where the last hill was dropped in one of the rows. Secured to the dropping-bar O is a rod, W, which is preferably provided at its rear end with a friction-roller, where it bears upon the top of the spring V. Each time that the dropping-bar is moved this rod W passes over the central bent portion of the spring V and depresses its free end, so as to cause it to mark in the ground.

The object in having the marker operated by means of the dropping-bar is to dispense with the clogging of the wheel, which always takes place, and especially when the marker is attached to the periphery of the wheels in the usual manner. When the wheels become clogged with dirt, they travel a greater distance at each revolution, and then when the dirt is cleaned off the spaces marked on the ground decrease in distances apart. Where the marker is operated by the dropping-bar, as shown, the distances between the marks must always be absolutely correct, because the slides in the seed-boxes and the marker are operated at the same time by the dropping-bar.

In order to prevent the ends of the spokes in the wheel D from becoming clogged, the spring-scraper X is secured to the under side of the front end of the frame B, and this scraper keeps the points always free and prevents the wheel from moving a greater distance at each revolution, as would be the case if the points of the wheel were allowed to become clogged. When it is desired to increase the distance between the hills of corn, there is to be attached to the outer end of each of the spokes an extension, Y, which is similarly shaped and fits over the outer ends of the spokes, as shown. Each of the spokes has a stud or projection formed upon it, and in each of the extensions is formed an L-shaped slot, by means of which the extension can be fastened firmly in place. These extensions, according to their length, enable the distances between the hills of corn to be increased at the will of the driver. For ordinary planting these extensions are not needed.

Having thus described my invention, I claim—

1. The combination, with the corn-planter, of the frame B, which is loosely connected thereto and adapted to be raised at its rear end, the shaft C, journaled in said frame and provided with the operating-wheel D and the ratchet-wheel S, cams E, secured to the wheel D, the rocking shafts H, journaled upon the frame B and connected together by the rod I, the rod J, connected to one of the rocking shafts, the operating-lever L, pivoted upon the frame, the seed-slide, and the rod T for causing the shaft C to partially revolve, substantially as shown and described.

2. The combination of the dropping-bar O, provided with a projection, W, and the operating-lever L, with the spring V, which is secured to the frame at one end, and which has its other end loose, so as to strike the ground each time the dropping-bar is moved endwise, substantially as set forth.

3. The operating-wheel D, having the ends of its spokes projecting beyond the rim, and the extensions, which are to be applied to the ends of the spokes, the parts being combined and arranged to operate substantially as specified.

In testimony whereof I affix my signature in presence of two witnesses.

WILLIAM H. STEVENS.

Witnesses:
F. A. LEHMANN,
EDM. P. ELLIS.